United States Patent
Delaney et al.

(10) Patent No.: US 7,212,622 B2
(45) Date of Patent: May 1, 2007

(54) CALL ROUTING SYSTEM

(75) Inventors: Mark Delaney, Langhorne, PA (US); Peter Fyhrie, Portland, OR (US)

(73) Assignee: ITXC IP Holdings SARL, Luxembourg (LU)

( * ) Notice: Subject to any disclaimer, the term of this patent is extended or adjusted under 35 U.S.C. 154(b) by 60 days.

(21) Appl. No.: 10/075,151

(22) Filed: Feb. 14, 2002

(65) Prior Publication Data

US 2003/0152210 A1 Aug. 14, 2003

(51) Int. Cl.
*H04M 7/00* (2006.01)

(52) U.S. Cl. .......................... 379/221.02; 379/114.02; 370/252; 370/352; 709/231; 709/240

(58) Field of Classification Search ........ 370/352–356, 370/2, 238, 238.1, 401–405, 351, 249; 379/900, 379/901, 221.01, 219, 220.01, 93.01, 100.14, 379/196–200, 207.03, 207.11, 221.02, 211.02, 379/114.02, 1.01, 112.02; 709/204, 229, 709/223–227, 232, 238, 239, 249, 201, 240, 709/231; 455/445, 552.1; 707/3; 705/35

See application file for complete search history.

(56) References Cited

U.S. PATENT DOCUMENTS

| | | | | | |
|---|---|---|---|---|---|
| 4,905,273 | A | * | 2/1990 | Gordon et al. | 379/93.01 |
| 5,852,779 | A | * | 12/1998 | Sawyer | 455/445 |
| 5,862,203 | A | * | 1/1999 | Wulkan et al. | 379/114.02 |
| 6,115,460 | A | * | 9/2000 | Crowe et al. | 379/211.02 |
| 6,134,315 | A | * | 10/2000 | Galvin | 379/219 |
| 6,215,783 | B1 | * | 4/2001 | Neyman | 370/353 |
| 6,295,292 | B1 | * | 9/2001 | Voit et al. | 370/352 |
| 6,404,864 | B1 | * | 6/2002 | Evslin et al. | 379/112.01 |
| 6,459,783 | B1 | * | 10/2002 | March et al. | 379/211.02 |
| 6,463,053 | B1 | * | 10/2002 | Chen | 370/352 |
| 6,490,274 | B1 | * | 12/2002 | Kim | 370/352 |
| 6,567,399 | B1 | * | 5/2003 | Schuster et al. | 370/352 |
| 6,584,110 | B1 | * | 6/2003 | Mizuta et al. | 370/401 |
| 6,600,735 | B1 | * | 7/2003 | Iwama et al. | 370/352 |
| 6,661,785 | B1 | * | 12/2003 | Zhang et al. | 370/352 |
| 6,717,939 | B1 | * | 4/2004 | McGrew | 370/352 |
| 6,760,312 | B1 | * | 7/2004 | Hitzeman | 370/252 |
| 6,781,983 | B1 | * | 8/2004 | Armistead | 370/353 |
| 6,801,523 | B1 | * | 10/2004 | Osman | 370/352 |
| 6,868,080 | B1 | * | 3/2005 | Umansky et al. | 370/354 |
| 7,133,922 | B1 | * | 11/2006 | She et al. | 709/231 |
| 2001/0036172 | A1 | * | 11/2001 | Haskal | 370/352 |
| 2002/0049654 | A1 | * | 4/2002 | Thomas et al. | 705/35 |
| 2002/0114439 | A1 | * | 8/2002 | Dunlap | 379/219 |
| 2002/0150080 | A1 | * | 10/2002 | Bhattacharya et al. | 370/351 |
| 2003/0095542 | A1 | * | 5/2003 | Chang et al. | 370/352 |
| 2003/0123436 | A1 | * | 7/2003 | Joseph et al. | 370/352 |
| 2003/0123632 | A1 | * | 7/2003 | Smith | 379/220.01 |

* cited by examiner

*Primary Examiner*—Fan Tsang
*Assistant Examiner*—M. S. Alam Elahee
(74) *Attorney, Agent, or Firm*—Kaplan Gilman Gibson Dernier LLP

(57) ABSTRACT

A networking system includes telephone switches and data network gateways for routing calls either over the public telephone network or over the packet switched data network. A router examines initiated calls and selects either the telephone network or a data network for completing the call. A Network Operations Center (NOC) monitors the performance of plural gateways, and updates routing information in the router and/or in the gateways, which may be used for future calls.

44 Claims, 9 Drawing Sheets

CALL ROUTING SYSTEM

FIELD OF THE INVENTION

The present invention relates to telephony. More particularly, in some embodiments, the present invention relates to a system and method for monitoring, evaluating and actively managing telephone-call quality in data-network-based telephony networks. The present invention also relates to a technique of selecting from among at least a telephone network and a packet switched data network in order to convey a call to a remote location.

BACKGROUND OF THE INVENTION

Data networks such as the Internet are now being used to transmit voice. Such data-network-based telephony networks provide an alternative to public-switched telephone networks ("PSTNs") for placing telephony calls.

FIG. 1 depicts a schematic diagram of a system 100 for voice communications over a data network in the prior art. The system includes data network 102 and public-switched telephone networks ("PSTN") 120 and 122. The specifics of the architectures and communications protocols of such systems are not described herein except to note that they are quite different from one another such that direct communication therebetween is not possible. It will be appreciated that while two PSTNs (i.e., PSTN 120 and 122) are depicted, there is, at least functionally, only one worldwide PSTN.

Communication between a PSTN and a data network is implemented via a "gateway." A gateway is an entrance to and an exit from a communications network. A gateway is typically an electronic repeater device that intercepts and translates signals from one network to another. A gateway often includes a signal conditioner that filters out unwanted noise and controls characters. In data networks, gateways are typically a "node" on both networks that connects two otherwise incompatible networks. Thus, gateways often perform code and protocol conversions. Such an operation would be required for communication between a PSTN and a data network. Assuming an analog voice signal is delivered from the PSTN, the gateway digitizes that signal from the PSTN and encodes it and transmits it as "packets" (hereinafter "digitized voice signal") over the data network according to data network protocols. In other embodiments, the signal from the PSTN is a digital signal, such that analog-to-digital conversion is not required. Protocol conversion is still required.

An element associated with a gateway is a "gatekeeper." A gatekeeper is responsible for gateway registration, address resolution and the like. A gatekeeper may be viewed as the router that directs a digitized voice signal to a "terminating" gateway (i.e., a gateway that provides protocol conversion for transmission over a PSTN, for example, to a telephone). As used herein, the term "gateway" includes both the gateway and gatekeeper functions.

System 100 therefore also includes gateway 110 that acts as a conduit between PSTN 120 and data network 102, and gateway 112 serving as a conduit between data network 102 and PSTN 122. The system further includes telephone 130 that is connected, via link L1, to PSTN 120 and telephone 136 that is connected, via link L8, to PSTN 122. The links that are depicted in FIGS. 1 and 2 are, as is well known, trunk lines, trunk groups, etc., as appropriate.

In operation, voice message 140 from telephone 130 is transmitted over link L1 to PSTN 120. Within PSTN 120, voice message 140 is routed to switch S2 over link L2. Switch S2, the operation of which is well known in the art, will typically route voice message 140 to another switch (not shown) over a trunk group (not shown). In such a manner, voice message 140 moves through PSTN 120 being routed from switch to switch until it is carried over a final link L3 out of PSTN 120. Voice message 140 is then carried, over L4, to gateway 110.

"Originating" gateway 110 performs protocol conversion and digitizes, as required, voice signal 140. Voice message 140 is then routed (the gatekeeper's function) into data network 102. For clarity of presentation, the voice message will be assigned the same reference numeral (e.g., 140), notwithstanding the fact that the signal carrying the message is physically changed during transmission through the system.

Message 140 is transmitted over call path DNCP to (call-) "terminating" gateway 112 wherein the signal leaves data network 102. Note that the designation "originating" or "terminating" applies on a call-by-call basis. In other words, for a first call, a particular gateway can be an originating gateway, while for a second call, that same gateway can be a terminating gateway. Moreover, packets typically flow in both directions since both parties typically talk.

A call path through a data network, such as call path DNCP through data network 102, is not fixed according to a defined hierarchy as in a PSTN. Rather, an originating gateway "selects" a terminating gateway and the voice signal is routed by successive network elements (e.g., routers, bridges, etc.) through the data network to the terminating gateway. Since routing decisions are made by each network element, call path DNCP is not a priori known or set.

Gateway 112 receives voice message 140 and converts it to a form suitable for transmission through PSTN 122. Voice message 140 is delivered over link L5 to PSTN 122. Within PSTN 122, voice message 140 is routed via over links, such as link L6, to switches, such as switch S4. Voice message 140 is carried over link L7 out of PSTN 122 to link L8 to telephone 136 to complete the call.

Such prior art systems typically suffer from significant drawbacks. Perhaps the most significant drawback is that on some data networks, such as the Internet, there are no means by which call (e.g., voice) quality is monitored and actively managed. As such, a need exists for a data-network-based telephony system that efficiently transmits telephone calls while actively managing quality of such transmissions.

SUMMARY OF THE INVENTION

In some embodiments, the present invention provides a distributed monitoring, evaluation and routing ("DiMER") system that provides active management of a data-network-based telephony networks. Among other benefits, the DiMER system enhances voice quality of telephone calls that are placed over such networks.

In accordance with the present teachings, such a system, and data-network-based telephony networks incorporating the same, advantageously route calls to meet call-quality standards and/or cost goals, among other targets. Telephony networks in accordance with the present invention advantageously comprise the DiMER system, PSTNs, gateways and a data network.

In data-network-based telephony networks, problems can arise within the data network at any of a plurality of network elements, or, alternatively, at gateways themselves. Unlike PSTNs, which have a rigid, well-defined routing hierarchy, no fixed call route is a priori defined through a data network.

As such, identifying a problematic network element, and rerouting to avoid such an element, is problematic.

In accordance with the present invention, the cause of problems arising within the data network is "ignored" for routing purposes. Rather, in the present invention, routing is addressed by focusing on the originating and terminating gateways. This approach is advantageously used because call routes over a data network to different terminating gateways are typically different. Thus, even though the route to a terminating gateway is not a priori known, whatever route is taken, that route is reasonably assumed to be uniquely associated with that gateway. As such, if compromised performance or a failed call attempt is detected, the terminating gateway (which is known) is the focus, regardless of the actual location of the problem (which can be hard to locate).

In view of the foregoing, and in accordance with the present teachings, the network is operated/administered/managed (i.e., operating goals for the network, whether they be cost, quality or other targets, are achieved) by shifting or reallocating call traffic between available terminating gateways based on system performance.

To implement such an approach, "problem" gateways must be identified. In the embodiments described herein, such identification is performed by (1) obtaining call-related data (hereinafter "call metrics") from gateways via a "data acquisition element;" and (2) adopting a mode of analysis that readily identifies such problem gateways. In the illustrated embodiments, the analysis function is advantageously performed by an "analysis element" via a mode of analysis referred to herein as "banding." It will be understood that "banding," which is described later in this Specification, is simply one of a variety of suitable approaches for data analysis as may occur to those skilled in the art in view of the present teachings, and that such other methods may suitably be used.

Once a mode of analysis is adopted (e.g., "banding"), call metrics are advantageously organized or processed into a form that is useful for that mode for analysis. Moreover, having identified "problem" gateways, data must be organized in a way that facilitates shifting call traffic between acceptable gateways to meet quality standards or other goals.

To that end, and in accordance with an embodiment of the present invention, "portfolios" are generated. Each portfolio indicates, for a particular "DNIS," the percent allocation or routing of call-traffic to "acceptable" gateways (i.e., gateways that can accept calls in the DNIS). Briefly, the term "DNIS" refers to a collection of digits within a telephone number that can be used to identify telephone numbers having such digits as belonging to a particular group or "dialing plan." For example, "732" can be a DNIS. Further description of DNIS is provided later in this Specification.

An initial call-traffic allocation within a portfolio is developed by the network administrator based on internal policy considerations (e.g., cost, quality, etc.). Changes are made in each portfolio (i.e., shifting the allocation of call traffic among the various acceptable terminating gateways) as a function of recent network performance (as indicated by the collected and processed call metrics) among any other parameters, to meet the business objectives of the network administrator. In some embodiments, such allocation is based on "best value routing," which considers both call quality and cost in the allocation calculus. Such changes are made by a "routing element."

Once a new allocation is established within the portfolio, such allocation must be implemented. An illustrative methodology presented herein for implementing the revised allocation involves using historical data that provides a breakdown of call traffic for each DNIS by "sub-DNIS" (i.e., the next significant digit following the DNIS). Sub-DNIS are "allocated" to each gateway (i.e., telephone numbers within the sub-DNIS are route to an appropriate gateway) as required to satisfy the desired call-traffic allocation.

In a further embodiment of the present invention, a router is placed in direct communication with a customer premises equipment (CPE) such as a telephone or computer. The router examines properties of the dialed telephone number, and determines whether the number is within a specified class. Depending upon the outcome, the call may be routed to either an Internet gateway or directly to a telephone switch.

Calls routed through an Internet gateway are routed by having two data devices examine the called telephone number. The first examination of the called number is performed by the router, in order to ascertain whether to route the call over the Internet or the telephone network. While such an examination occurs, the call may be "parked" at the router, and the calling number may be preferably stored for later use by the system in connection with authentication and authorization.

The second examination of the called telephone number occurs at an originating gateway to which the call is routed, if the Internet (or other data network) is selected. If such data network is selected, the originating gateway or other computer with preferably access the stored calling number from the router and perform authentication and authorization services in order to ensure that the calling number is a number authorized to use the data network for such telephone call. The router may also select from among plural originating gateways, and each originating gateway may select from among plural terminating gateways.

Other aspects of the present invention will become more clear from the following Detailed Description and the accompanying drawings.

DETAILED DESCRIPTION OF THE INVENTION

For clarity of explanation, the illustrative embodiments of the present invention are presented as a collection of individual functional blocks. The functions that such blocks represent can be provided using either shared or dedicated hardware, including, without limitation, hardware capable of executing software. Illustrative embodiments may comprise digital signal processor hardware, read-only memory (ROM) for storing software performing the operations described below, random-access memory (RAM) for storing DSP results and for storing collected-call information, and non-volatile memory for storing pre-established rules for evaluating call quality.

Figure 1:
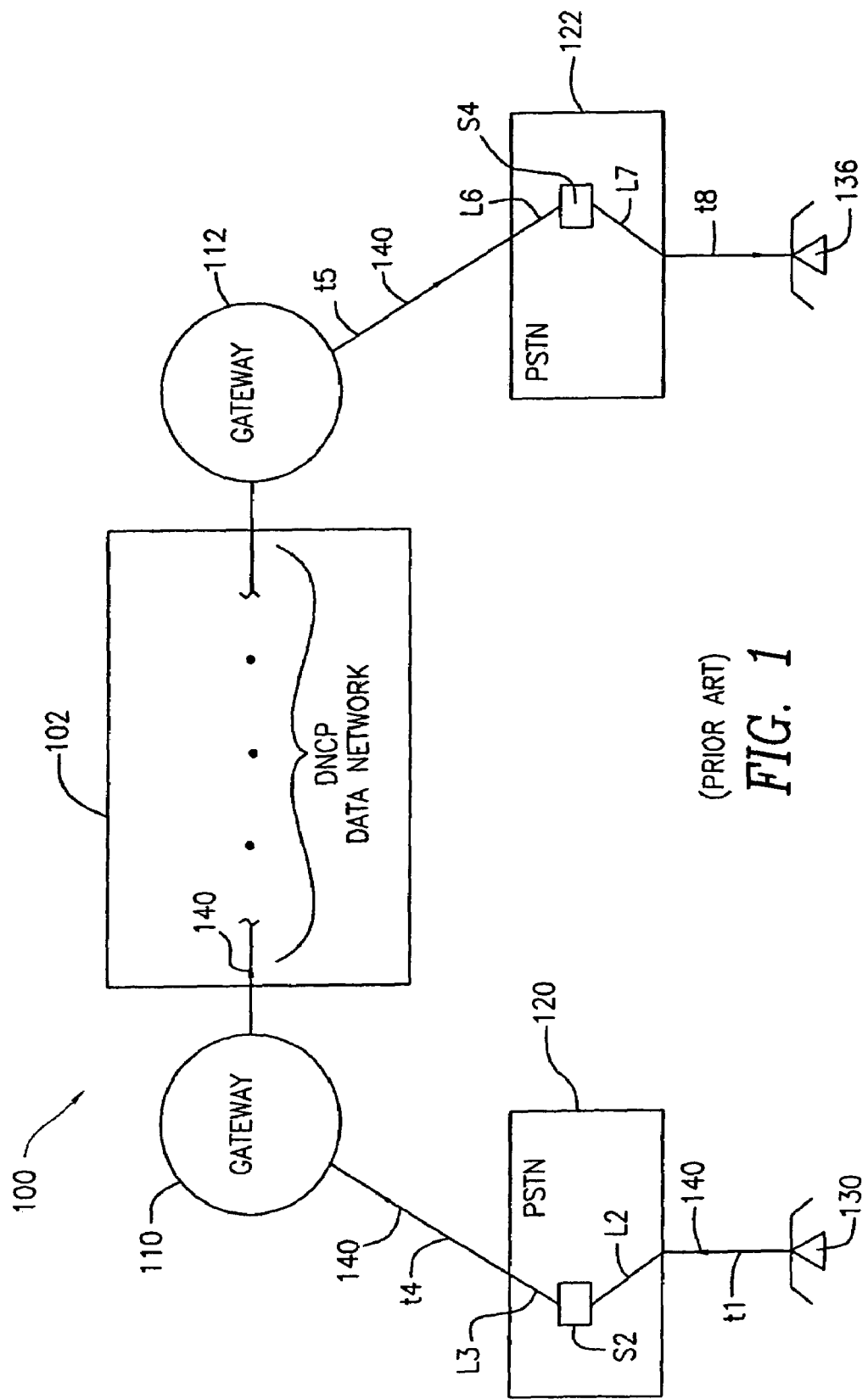
FIG. 1 depicts voice communications over a data network in the prior art.
Figure 2:
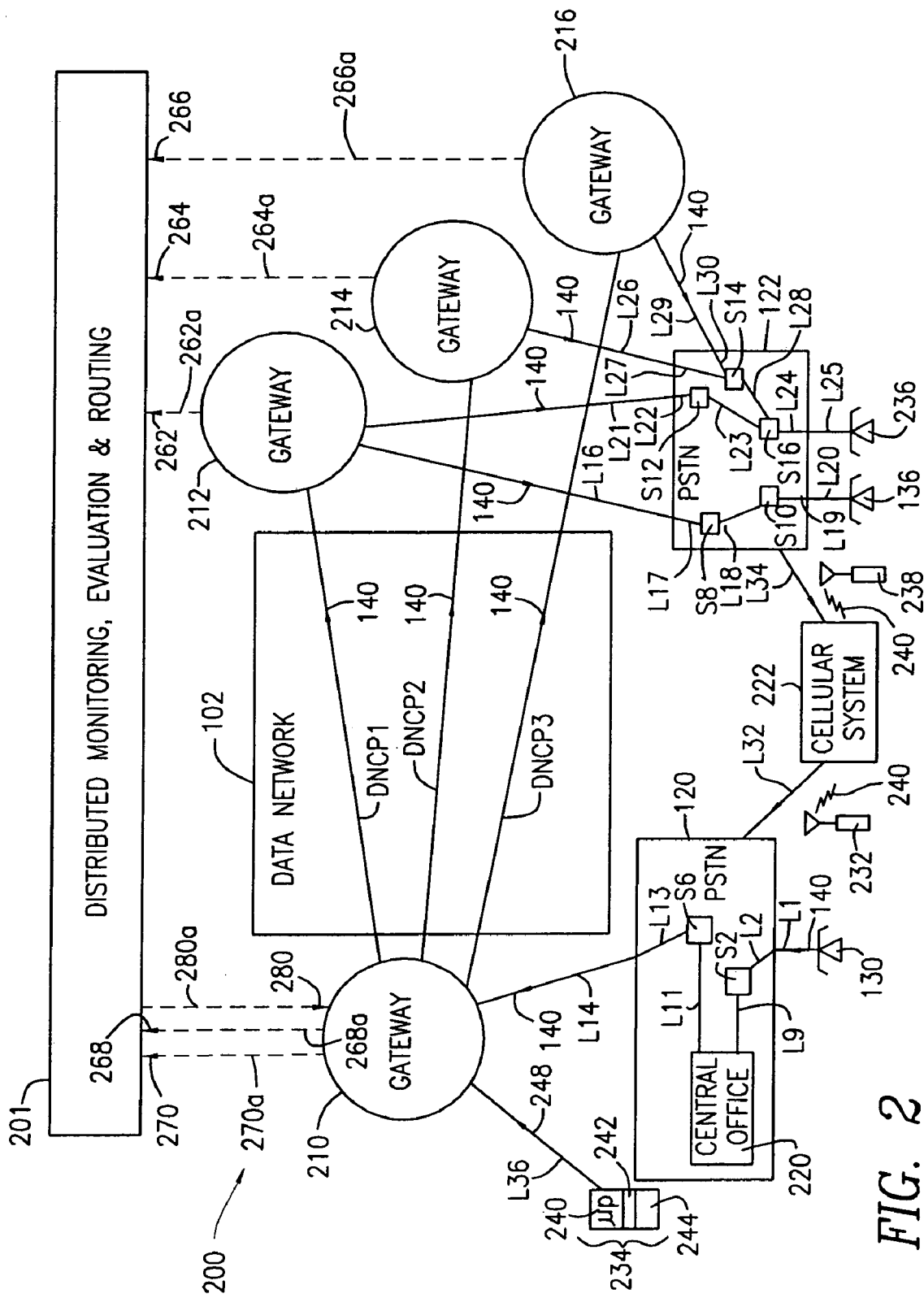
FIG. 2 depicts a high-level schematic diagram of a data-network-based telephony system in accordance with an embodiment of the present invention.

FIG. 2 depicts a portion of data-network-based telephony network ("DNT") 200 in accordance with an illustrated embodiment of the present invention. From a high-level perspective, the present network comprises a distributed monitoring evaluation and routing (DiMER) system 201 that is used in conjunction with elements of a standard network-based telephone network, such as network 100 depicted in FIG. 1. Such standard elements include "gateways" that facilitate communications between PSTNs and data networks (see Background section). As described further below, the "intelligence" imparted from DiMER system 201 to "originating" gateways, among other network elements, distinguishes the performance and operation of such gateways and DNTs incorporating the same, from those in the prior art.

The depicted portion of illustrative DNT 200 includes, among other elements, DiMER system 201, data network 102, two PSTNs 120 and 122, four gateways 210, 212, 214 and 216, and three wire-line telephones 130, 136 and 236, interrelated as shown. Gateway 210 serves as an interface between PSTN 120 and data network 102. Similarly, gateways 212, 214 and 216 function as an interface between data network 102 and PSTN 122. Telephone 130 is accessible over PSTN 120, and telephones 136 and 236 are accessible over PSTN 122.

Gateway 210 is depicted as an originating gateway, and gateways 212, 214 and 216 are depicted as terminating gateways. As previously indicated, the designation "originating" or "terminating" applies on a call-by-call basis, such that each gateway is both an originating gateway and a terminating gateway as a function of where the call originates and where it terminates. For clarity of explanation, originating and terminating gateways will, however, be treated as separate elements. Furthermore, it is understood that communication is bi-directional. It will be appreciated that implementations of the present network will typically contain many more gateways (scattered across the world) than the four gateways depicted in DNT 200.

In operation, a calling party represented as telephone 130 calls into PSTN 120 over link L1, entering a destination telephone number for call or message 140. For the purposes of illustration, the called telephone number corresponds to telephone 236.

Within PSTN 120, call 140 is carried over link L2 to switch S2, which, in one embodiment, is assumed to be a client of the administrator of data-network-based telephone network in accordance with the present teachings. In such an embodiment, switch S2 routes call 140 to the administrator's central office 220 over link L9. In alternative embodiments, a call can be placed directly into central office 220. Central office 220 routes call 140 over link L11 to switch S6, which is advantageously controlled by the aforementioned administrator.

In some embodiments, switch S6 includes "unified routing information." In prior art DNTs, routing across the PSTN (e.g., switches) is treated separately and independently from the routing through the data network. The unified routing information of the present invention, advantageously provided in the form of a unified routing table, results from treating the PSTN and data network as elements of a single network. Unified routing provides an increased measure of control over the DNT in comparison with prior art systems. Such additional control can result in reduced costs to the administrator and/or increased control over call quality, among other benefits.

Based on the routing information in switch S6, call 140 is routed over links L13 and L14 to gateway 210. In some embodiments, the calling party at telephone 130 must be authenticated as a valid user before gaining access to gateway 210.

Having received a called telephone number, and a request to place such a call over a data network voice channel, gateway 210 generates or is provided with a list of termination gateways that can accept the call. In the illustrative embodiment depicted in FIG. 2, any of gateways 212, 214 and 216 can accept call 140 intended for telephone 236, as is shown by links L21, L26 and L29 that link such gateways, via switches S12, S14 and S16 in PSTN 122, to telephone 236. A call intended for telephone 136 must, however, be routed to gateway 212. From gateway 212, that call is routed over link L16 to switches S8 and S10 in PSTN 122 and then to telephone 136 over links L19 and L20.

The list of "acceptable" termination gateways can be generated solely by gateway 210, or, in other embodiments, in conjunction with other gateways. Prior art gateways are capable of generating a "list" of terminating gateways that are physically able to accept calls for a specified telephone number. Such a list may be "prioritized" wherein calls are initially routed to a first gateway. If the call cannot be completed by the first gateway, the call is routed to a second gateway, etc. Unlike the prior art, and in accordance with the present invention, a call allocation is specified for acceptable gateways. Such an allocation may dictate that 30 percent of the calls are directed to a first gateway, 45 percent of the calls are directed to a second gateway, and 25 percent of the calls are directed to a third gateway.

In one embodiment, the call allocation is based on call metrics obtained from originating and terminating gateways and the analysis of such call metrics. In another embodiment, call allocation is determined as a function of call quality (as determined by the call metrics) as well as the price charged by the gateway for terminating the call. Call allocations are advantageously periodically updated (e.g., hourly) based on real time data regarding system performance (i.e., the call metrics).

Based on the call allocation data, which is again advantageously provided in the form of a unified routing table, originating gateway 210 selects a terminating gateway to which to route the call among the acceptable gateways. For example, among acceptable gateways 212, 214 and 216, the list may specify that terminating gateway 216 is allocated most of the calls, and it may be determined that at the present time it is appropriate to route call 140 thereto.

As routing through a data network does not follow a predefined hierarchy, the route taken through a network (i.e., from one network element to the next) from an originating gateway to a terminating gateway is not a priori known. As such, if problems arise, it may be very difficult to determine the cause/location of the problem. In the prior art, the cause or location of a problem is typically sought.

It is reasonably assumed, however, that the call path between an originating gateway and a first terminating gateway is different than the call path between the same originating gateway and a second terminating gateway. As such, and in accordance with the present invention, if a particular terminating gateway is having problems terminating calls (e.g., as determined from analysis of collected call metrics), calls are rerouted to another gateway. In other words, rather than trying to determine the cause/location of the problem as per the prior art, the call allocation among the gateways is changed.

Returning to the illustrative example (call 140 intended for telephone 236), after protocol conversion, etc., call 140 is routed to gateway 212, 214 or 216 as appropriate, over respective call paths DNCP1, DNCP2 and DNCP3. Assuming that call 140 is sent to gateway 216, that gateway performs the protocol conversion, etc., and directs the call over link L29 to PSTN 122. In PSTN 122, call 140 is routed to switch S14 over link L30, and from there to switch S16 over link L28. Finally, call 140 is routed out of PSTN 122 via link L24, and delivered to telephone 236 over link L25.

In addition to connecting calls between wireline telephones, the present system and method is useful in conjunction with cellular telephones, such as cell phones 232 and 238 that are depicted in FIG. 2. In particular, if a call 240 is placed by cell phone 232, that call is carried over cellular system 222 in well-known fashion and enters PSTN 120 over link L32. Call 232 is then processed as previously described and is routed from PSTN 122 into cellular system 222 and to cell phone 238. Of course, a call may likewise be placed between a cell phone and a wireline telephone, so that only a single entry into cellular system 222 is necessary.

In a further embodiment, the present system and method is used in conjunction with a "pc-phone" or like device that bypasses PSTN 120. In an illustrated embodiment, pc-phone 234 comprises a processor 240 running appropriate software, speakers 242 and microphone 244. Call 248 from pc-phone 234 is carried over link L36 to "gateway" 210. Actually, the call from such a pc-phone typically bypasses the gateway and is directed, at least in some embodiments, to a gatekeeper (not shown). As previously noted, as used herein, the term "gateway" incorporates the functions of a "gatekeeper."

As previously noted, after the call is terminated, quality-related metrics information pertaining to the call is transmitted from the terminating gateway (e.g., gateway 216), and, in some embodiments, the originating gateway (e.g., gateway 210) to DiMER system 201. In some embodiments, call quality is determined by DiMER system 201 from call metrics 262, 264, 266, 268 that are carried over links 262a, 264a, 266a and 268a to DiMER system 201. Likewise, the routing information that is generated by DiMER system 201 is based, for example, on such call quality, cost information and current route information 270 carried over link 270a from originating gateway 210. Routing information 280 developed by DiMER system 201 is transmitted to originating gateway 210 over link 280a.

Having described the manner in which a call is placed over the present telephony network and the data flow between the "standard" network elements and those of distributed monitoring and evaluation system 201, it is now appropriate to describe, in detail, DiMER system 201 and its operation. The description proceeds with reference in FIGS. 3A–6.

Figures 3A, 3B:
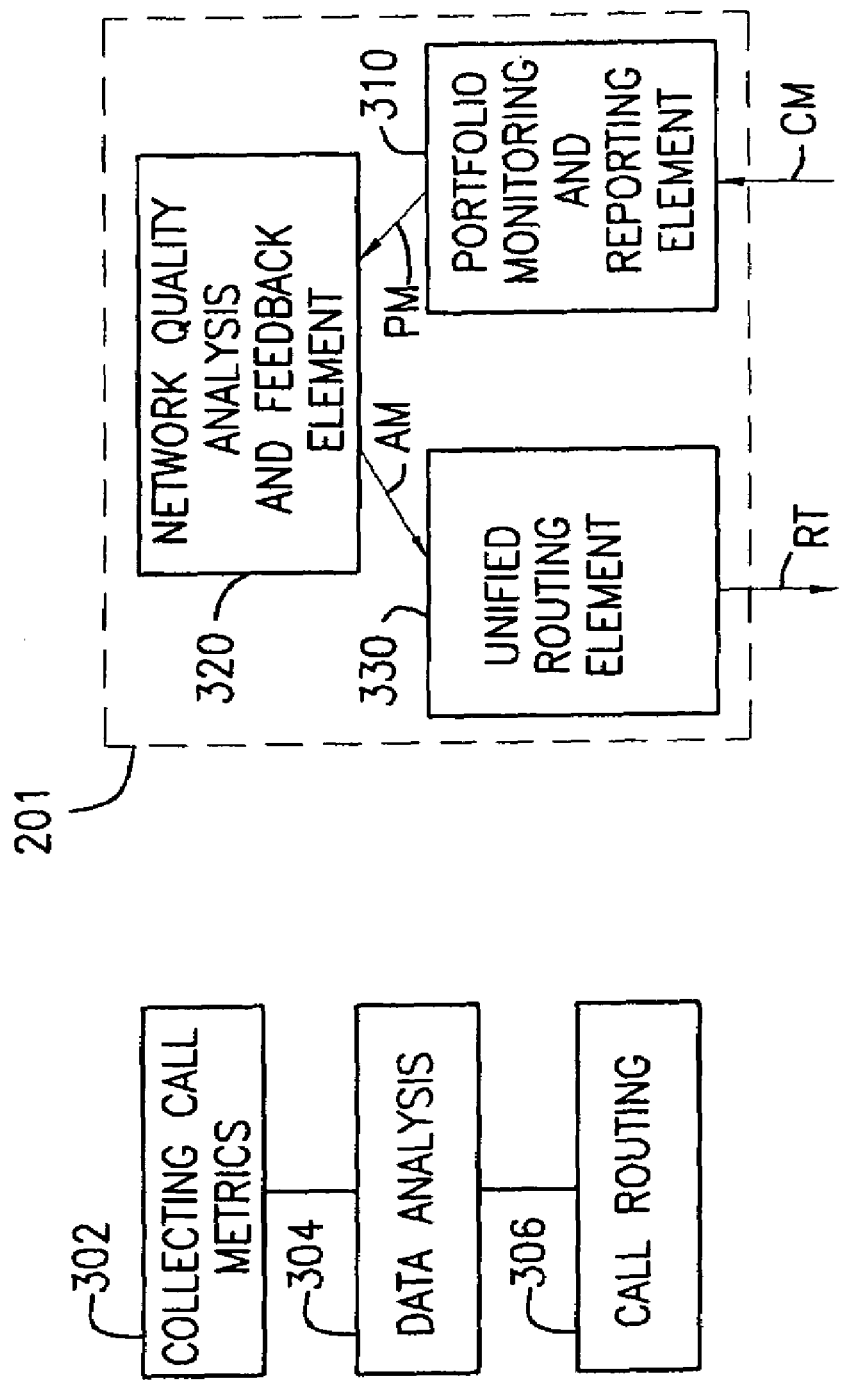
FIG. 3A depicts a high-level flowchart of an illustrative method for monitoring, evaluating and routing functions of the system of FIG. 2.
FIG. 3B depicts a high-level schematic diagram of basic functional elements of an illustrative distributed monitoring, evaluating and routing system in accordance with the present teachings.
Figure 4:
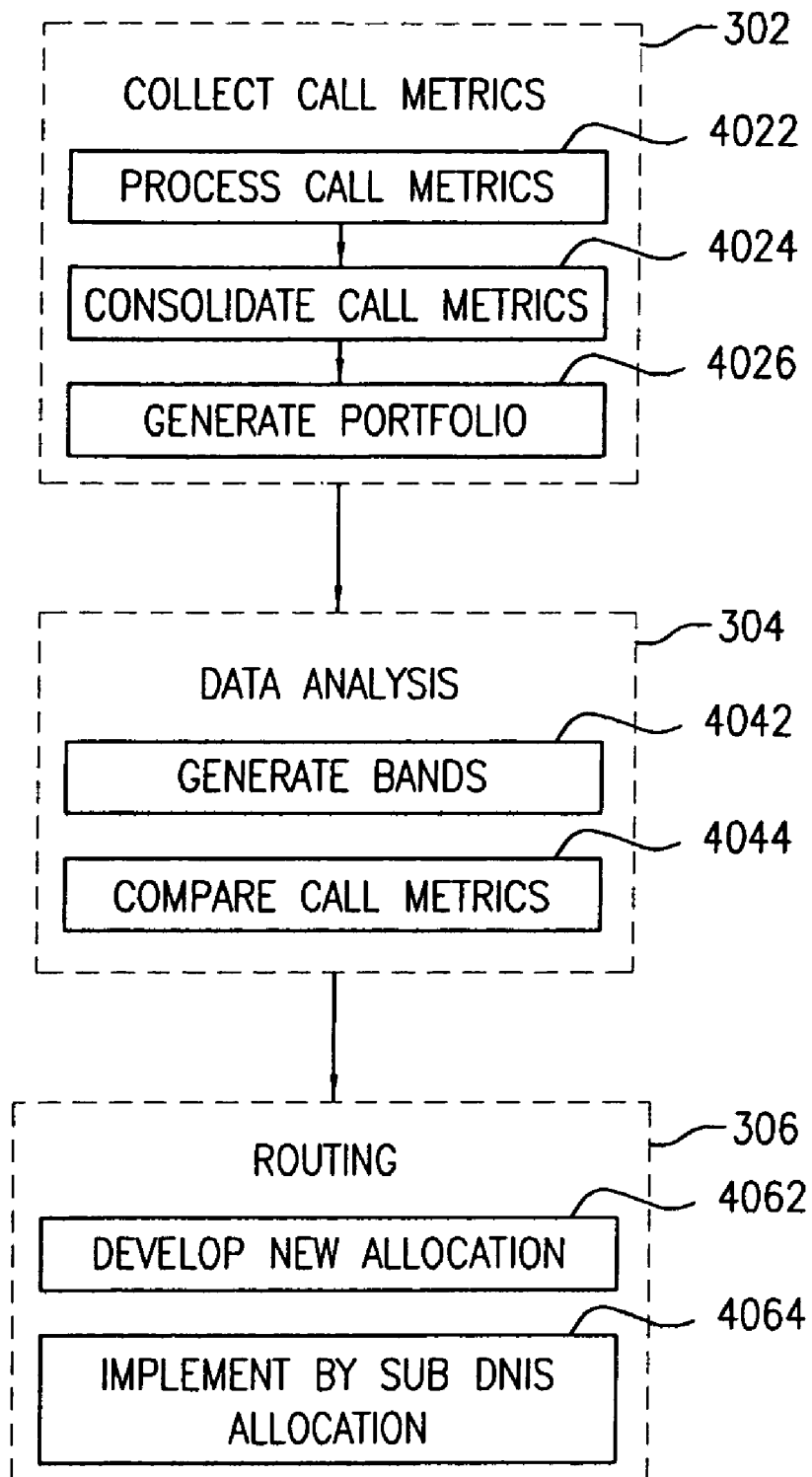
FIG. 4 depicts further illustrative operations comprising a method in accordance with the present invention.

FIGS. 3A and 3B provide a "high-level" description of the functional operation and organization of DiMER system 201. In particular, FIG. 3A depicts a high-level flow-diagram of a method of operation for an illustrative embodiment of DiMER system 201 and FIG. 3B depicts a schematic diagram of basic functional elements for implementing such operations. FIG. 4 depicts more detail of illustrative operations that comprise a method of operation in accordance with the present invention, FIG. 5 depicts additional information concerning an illustrative architecture of one of the basic functional elements depicted in FIG. 3B, and FIG. 6 depicts further information concerning an illustrative architecture of DiMER system 201.

Figure 5:
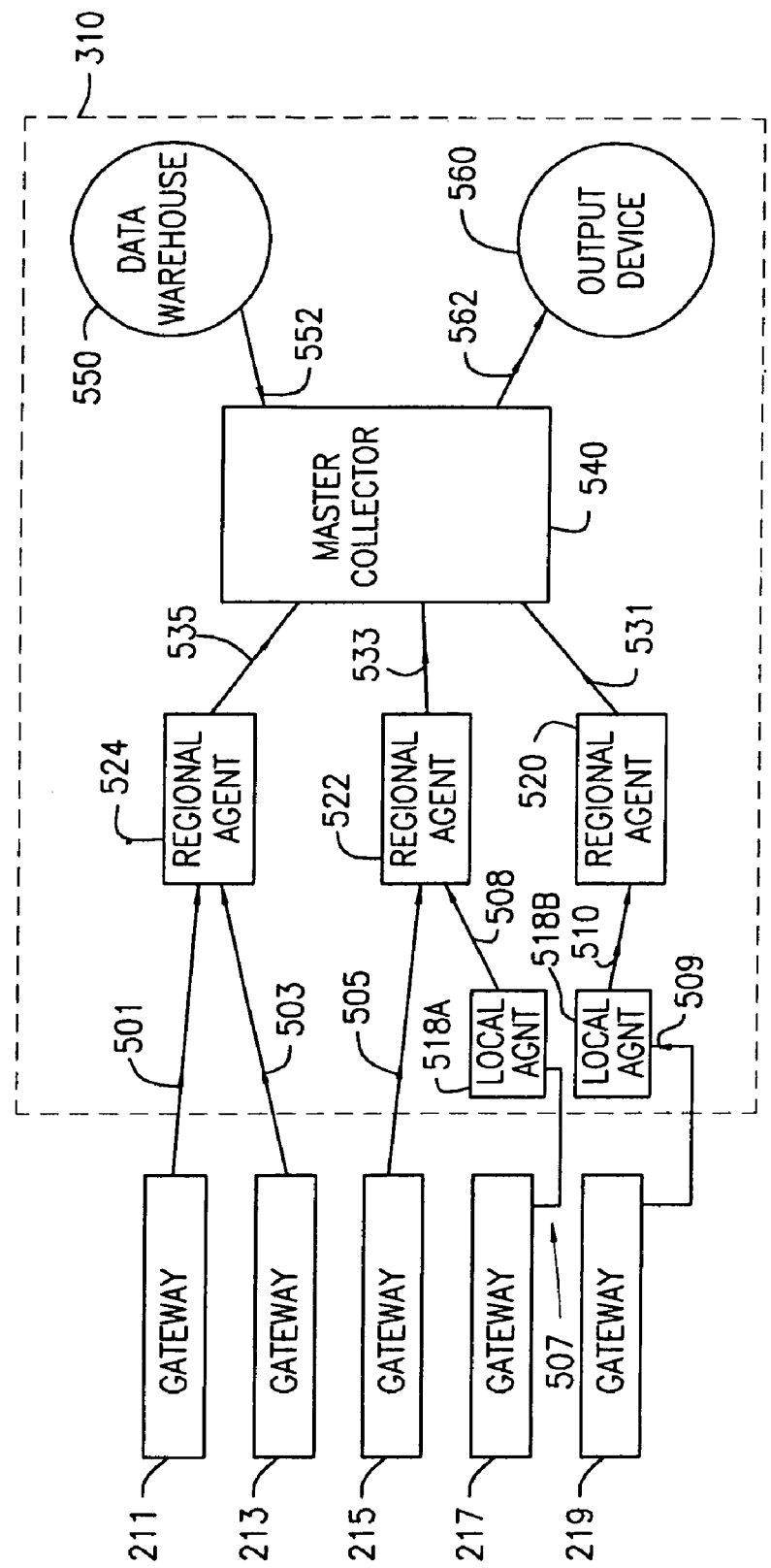
FIG. 5 depicts further detail of one of the functional elements shown in FIG. 3B.
Figure 6:
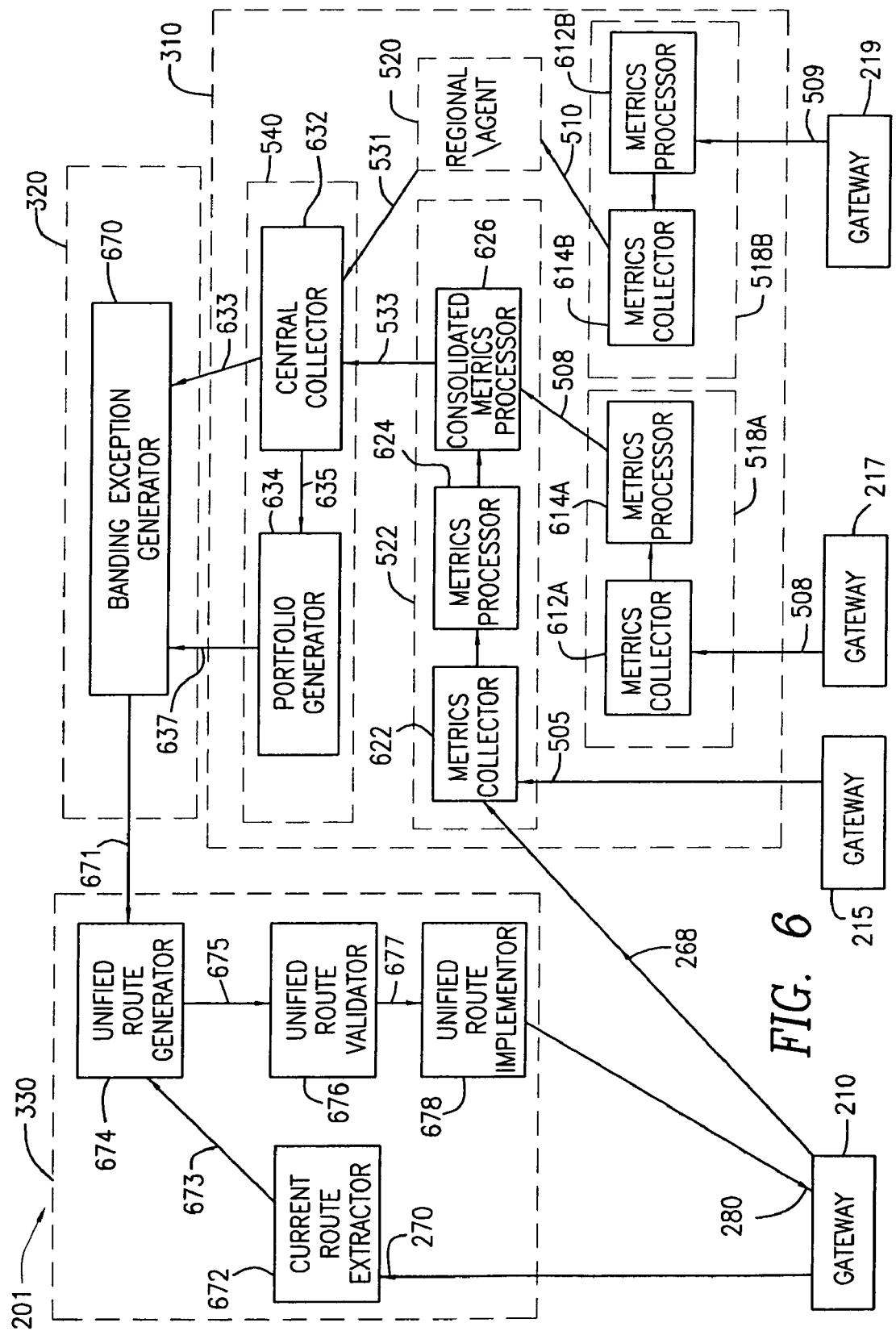
FIG. 6 depicts further detail of the functional elements shown in FIGS. 3B and 5.

It will be understood that architecture depicted for DiMER system 201, such as that depicted in FIGS. 3B, 5, 6, etc., is merely illustrative. Such architecture, and the association of specific functions therewith, is for pedagogical purposes and for clarity of presentation. As a result of its "distributed" nature, DiMER system 201 may advantageously be organized in a wide variety of ways as will occur to those skilled in the art to provide active management.

In an illustrative embodiment, DiMER system 201 provides a data acquisition functionality, a data analysis functionality and a call routing functionality. Such functionalities are depicted in the flow diagram of FIG. 3A as collecting call metrics 302, data analysis 304, and call routing 306. In view of such functionality, it is convenient to organize, at least conceptually, DiMER system 201 into three modules or elements for accomplishing such functions. Thus, in the illustrated embodiments, DiMER system 201 comprises a data acquisition element, a data analysis element, and a call routing element.

In an embodiment depicted in FIG. 3B, such an architecture is realized by portfolio monitoring and reporting element 310, network quality analysis and feedback element 320 and unified routing element 330. Call metrics CM are obtained by portfolio monitoring and reporting element 310 from originating and terminating gateways (not depicted in FIG. 3A). After suitable processing, process metrics PM are delivered to network quality analysis and feedback element 320 for data analysis. Analyzed metrics AM are received by unified routing element 330 for generating revised routing tables. The revised routing tables RT, which are advantageously unified routing tables, are provided to originating gateways and, in some embodiments, to switches controlled by the network administrator (not depicted in FIG. 3B).

In the illustrative embodiments depicted in FIGS. 5 and 6, portfolio monitoring and reporting element 310 includes, among other elements, "local agents" (e.g., local agent 518A and 518B), "regional agents" (e.g., regional agents 520–524), and a "master collector 540. In other embodiments, local agents are not used; rather, only regional agents and a master collector are used. As previously indicated, the "local agent" and the "regional agent" (and other functional elements, as well) are, at least in one embodiment, software that performs the functions attributed to such elements.

In the illustrated embodiments, portfolio monitoring and reporting element 310 (FIG. 3B) performs call metrics collection operations 302 (FIG. 3A). Although it is not depicted in the Figures, the illustrated architecture provides, in one embodiment, for a relatively greater number of widely-scattered local agents to report to a relatively smaller number of regional agents. For example, a regional agent located in Japan may monitor all local agents in Asia. The regional agents, in turn, report to a single master. Such a hierarchy, which proceeds from "local" (greatest in number) →"regional" (fewer in number)→"master," (one in number)

is a suitable approach for call metrics collection, processing, etc., in networks having a wide geographic coverage. It will be understood that other architectures may suitably be used for portfolio monitoring and reporting element 310.

Moreover, it may be advantageous to use a different architecture for portfolio monitoring and reporting element 310 when used in conjunction with data-network-based telephony networks having less extensive geographic coverage or otherwise configured in a different manner than the illustrative network. It is within the capabilities of those skilled in the art, having the benefit of the present teachings, to develop and implement such different architectures.

Regarding call metrics collection operation 302, such call metrics are advantageously collected from all of the gateways (originating and terminating) in the data-network-based telephony network. As described in more detail later in this Specification, such call metrics provide an indication of network performance and provide the basis for routing changes that are generated by unified routing element 330. In the illustrative embodiments of DiMER 201 that are depicted in FIGS. 5 and 6, metrics collection is performed by "local agents" 518A (reporting to "regional agent" 522) and 518B (reporting to "regional agent" 524) or directly by regional agents 522 and 524.

More particularly, in FIG. 5, call metrics 501 from gateway 211, and call metrics 503 from gateway 213 are reported directly to regional agent 524. Call metrics 505 from gateway 215 is reported to regional agent 522. Local agent 518A receives call metrics 507 from gateway 217, advantageously provides preliminary processing of such call metrics 507, as described in more detail later in this Specification, and provides processed call metrics 508 to regional agent 522. Local agent 518B receives call metrics 509 from gateway 219, and reports processed call metrics 510 to regional agent 520.

FIG. 6 provides further illustrative architectural details, wherein metrics collection from gateway 217 to local agent 518A is implemented via metrics collector 612A, and metrics collection from gateway 219 to local agent 518B is implemented via metrics collector 612B. In some embodiments in which DiMER 201 does not utilize local agents, call metrics are provided directly from a gateway, such as (originating) gateway 210 and gateway 215, to an appropriate regional agent, such as regional agent 522. It should be understood that while only two regional agents are depicted in FIG. 6, portfolio monitoring and reporting element 310 will typically comprise many more of such regional agents, as a function of the geographic scope of the network. Likewise, in embodiments in which portfolio monitoring and reporting element 310 comprises local agents, many more than the two such local agents depicted in FIG. 6 will typically be used.

Local agent 510 can be located "at" a gateway. Such an agent is referred to herein as an "in-situ" local agent. In one embodiment, an in-situ local agent is realized as software running on a processor that is an element of a gateway. Alternatively, local agents can be situated at a remote location (e.g., software running on a processor that is physically remote from the gateway but in communication therewith).

Collected call metrics retrieved from gateways include, without limitation, data suitable for evaluating average call duration, average percent call completion and average "port" utilization (each gateway has a plurality of ports (e.g., 20) available for completing a call). It will be appreciated that the metrics listed above may be derived quantities that are calculated from "raw" data. It is within the capabilities of those skilled in the art to collect such raw data and to determine the specific data to be collected. In some embodiments, such average call duration metrics are not received directly from the gateways, but rather from a data storage site (e.g., data warehouse 550, see FIG. 5).

To facilitate analysis of the collected call metrics (operation 304), such call metrics are advantageously "processed" in accordance with operation 4022 (see FIG. 4). Such processing involves summarizing or organizing the collected call metrics. It will be appreciated that the data is advantageously organized or processed to facilitate transmission of that data, in some embodiments, processed in a way that is most appropriate for the analysis method adopted in operation 304. In the illustrated embodiments, such analysis is performed via "banding." As will become clearer later in this specification, the call metrics are advantageously organized, at least in part, on "per gateway" basis to facilitate analysis via banding.

In illustrative embodiment of DiMER 201 depicted in FIG. 6, metrics retrieved by local agents are processed therein via a "metrics processor." In particular, metrics processor 614A in local agent 518A processes call metrics collected by call metrics collector 612A, and metrics processor 614B in local agent 518B processes call metrics collected by call metrics collector 612B. In embodiments in which regional agents, such as regional agent 522, directly retrieve call metrics via a call metrics collector (e.g., collector 622), such call metrics are processed via an associated call metrics processor (e.g., processor 624) within the regional agent.

In large networks, the processed call metrics may benefit from some amount of "consolidation" before analysis. In the illustrative architecture of DiMER 201 depicted in FIG. 6, a consolidation operation 4024 is performed by regional agents, such as regional agents 522 and 520, in a consolidated metrics processor, such as processor 626 associated with regional agent 522 (consolidated metrics processor not shown for regional agent 520).

Thus, call metrics (e.g., call metrics 505) obtained (and processed) directly by a regional agent (e.g., regional agent 522), or that are obtained by the regional agent indirectly through local agents, are "consolidated" for ease of transmission, etc.

Consolidated processed metrics (e.g., 531, 533, etc.) are provided to master collector 540 (FIGS. 5 and 6). Central collector 632 within master collector 540 receives consolidated processed metrics from all regional agents in the system. Consolidated processed metrics 635 are delivered to portfolio generator 634 in master collector 540. As depicted in FIG. 5, master collector 540 is advantageously in communication with output device 560, which can be, for example, a display monitor or the like device for displaying collected data.

As DiMER 201 advantageously generates revised routes by shifting call traffic between acceptable gateways, data is advantageously organized in a way that facilitates such shifting. To that end, and in accordance with operation 4026 of an illustrative embodiment of the present invention, a plurality of "portfolios" are generated from the consolidated processed metrics by a "portfolio generator." In FIG. 6, portfolio generator 634 is depicted as being located in master collector 540.

Each portfolio provides "statistics" for one "DNIS." "DNIS" is an acronym for Dialed Number Identification Service. While often defined as a feature of 800 and 900 lines, the term "DNIS" is used herein to refer to a set of digits defining a dialing plan. For example, in the phone number (732) 555-1212, the digits "732" form an illustrative DNIS. Thus, the DNIS "732" includes all telephone numbers having the area code "732." Each DNIS may further comprise a plurality of "sub-DNIS." Given a DNIS "732," there are potentially ten sub-DNIS "732x." Thus, 7320, 7321, 7322, 7323, 7324, 7325, 7326, 7327, 7328 and 7329 are all sub-DNIS of the DNIS "732." The sub-DNIS "7325," for example, includes all telephone numbers having the area code "732" and having an exchange that begins with the digit "5." And, in turn, the sub-DNIS "7325" can be divided into sub-DNIS "7325x," and so forth.

The statistics provided by a portfolio include a call breakdown on a per-gateway basis. In other words, given the total calls for a particular DNIS, and given all gateways that terminate calls for the DNIS, the portfolio provides the percentage of calls terminated by each such gateway. Table I provides an illustrative portfolio for the DNIS "201."

TABLE I

Illustrative Portfolio for DNIS 201-

| Gateway | % of Call Traffic |
|---------|-------------------|
| GW1     | 20                |
| GW2     | 30                |
| GW3     | 40                |
| GW4     | 10                |

Thus, for the example of Table I, gateway GW1 terminates twenty percent of the calls having the DNIS "201." Similarly, gateways GW2, GW3 and GW4 terminate thirty, forty and ten percent, respectively, of the calls having the DNIS "201." The portfolio thus converts the collected call data from a "gateway-centric" view to a "DNIS-centric" view. In some embodiments, a portfolio is based on a combination of historical and real-time data (e.g., the real-time data is "blended" in to adjust historical allocations).

Consolidated call metrics 633 are provided to network quality analysis and feedback element 320 for analysis operation 304. In accordance with the present teachings, such "analysis" is advantageously performed via "banding," operation 4042 and comparison operation 4044 (see FIG. 4). In the embodiment depicted in FIG. 6, banding is performed by banding exception generator 670 in network quality analysis and feedback element 320.

"Banding" defines an acceptable range for a given call metric at a given gateway or per DNIS as a function of time (e.g., hours of the day, days of the week, weeks of the month, etc.). The "acceptable range" for a specific call metric is developed using historical data, which, in an illustrated embodiment, is available as historical data 552 from data warehouse 550 (see FIG. 5).

Consolidated call metrics 633, which advantageously provide network performance on a time basis, are compared (e.g., operation 4044 in FIG. 4) to the band defining acceptable performance. In such a manner, unacceptable performance is readily identified. Banding/comparison thus provides a terminating gateway's or DNIS's performance, as a function of time, for a specific call metric. The call metrics that are analyzed via the banding operation include, without limitation, percent call completion, average call duration and port utilization. As such call metrics are analyzed on a common basis (e.g., time), they can be considered in combination (e.g., applying weighting factors, etc.) to develop a single quality-assessment parameter.

Figure 7:
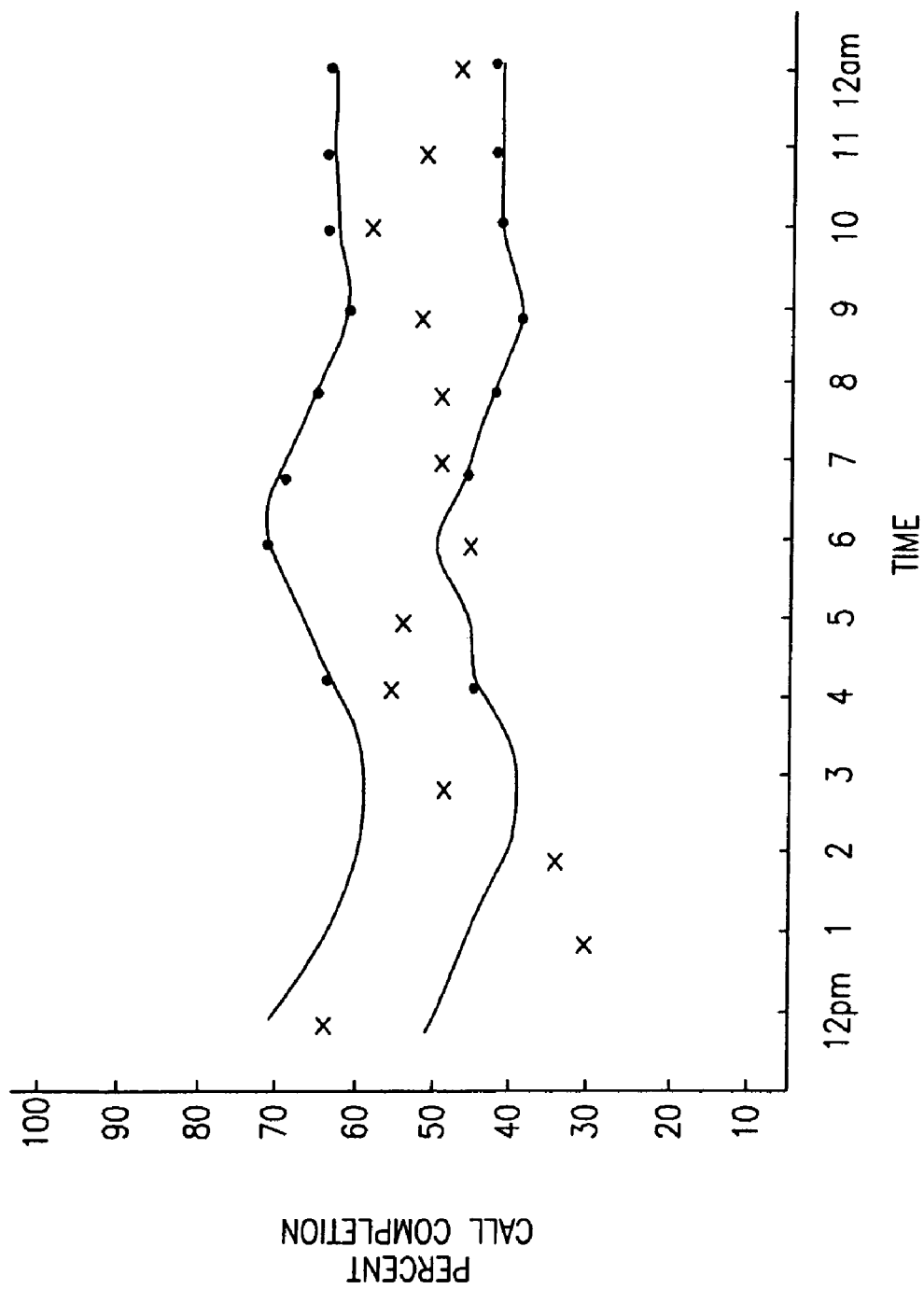
FIG. 7 depicts an illustrative example of banding.

An example of banding is depicted in FIG. 7, wherein percent call completion data is banded for a given gateway. The illustrative data used for the plot depicted in FIG. 7 is provided below in Table II.

TABLE II

Data for Banding Example of FIG. 7

| Time    | Upper Limit | Lower Limit | % Compl. | Out of Band |
|---------|-------------|-------------|----------|-------------|
| 12 p.m. | 70          | 50          | 65       | No          |
| 1 p.m.  | 65          | 45          | 30       | Yes         |
| 2 p.m.  | 60          | 40          | 35       | Yes         |
| 3 p.m.  | 60          | 40          | 50       | No          |
| 4 p.m.  | 65          | 45          | 57       | NO          |
| 5 p.m.  | 67          | 45          | 55       | No          |
| 6 p.m.  | 70          | 50          | 47       | Yes         |
| 7 p.m.  | 67          | 47          | 49       | No          |
| 8 p.m.  | 65          | 45          | 50       | No          |
| 9 p.m.  | 60          | 40          | 55       | No          |
| 10 p.m. | 65          | 45          | 60       | No          |
| 11 p.m. | 65          | 45          | 55       | No          |
| 12 a.m. | 65          | 45          | 50       | No          |

The banding operation for the illustrated gateway indicates the percent call completion is "out-of-band" (i.e., sub-standard) at 1 p.m., 2 p.m. and 6 p.m. for the illustrated gateway. The banding operation for other gateways (not illustrated), indicates that percent call completion is "in-band" (i.e., meets standards) at 1 p.m., 2 p.m. and 6 p.m.

Thus, data for each reporting gateway is "banded," in accordance via operations 4042/4044. The banding data, which, as indicated above, may be on a gateway basis, is cross correlated with the portfolios to relate DNIS to Gateways.

The portfolios (generated in portfolio generation operation 4026) and the results of banding (generated in analysis operation 304), collectively referenced as data 671 (see FIG. 6), are provided to unified routing element 330 to generate new routings per operation 306. In accordance with the illustrated embodiments, the new routings are developed by generating a new gateway allocation, as per operation 4062. The allocation is implemented via operation 4064 by sub-DNIS allocation, as described below.

In the illustrative architecture depicted in FIG. 6, data 671 is received by unified route generator 674. Moreover, in the embodiment depicted in FIG. 6, current routing information 270 is extracted via current route extractor 672 from gateway 210 and provided to unified route generator 674.

Based on the banding data, portfolio information and current routing information 270, a revised call-traffic allocation between gateways for each DNIS is developed. In addition to using call quality, such as may be obtained from the banding/comparison operations, as a basis for cal-traffic re-allocation, cost data and other factors can be considered as well. In one embodiment, the revised allocation is based on both call quality and cost. It is within the capabilities of those skilled in the art to develop algorithms that apply appropriate weighting factors, based on company policy/ goals, to quality data, cost data and any other parameters appropriate for consideration when re-allocating call traffic between gateways. Such routing table revisions can be performed on a periodic basis (e.g., hourly) to reflect network performance as determined by the banding operation.

Table III below provides illustrative data showing current routing information and a re-allocation of call traffic between gateways for a given DNIS in accordance with the present teachings.

TABLE III

Illustrative Call Routing Guidelines
Percent of Call Traffic for DNIS 609

| Gateway | Current Routing | Revised Routing |
|---|---|---|
| GW1 | 20 | 10 |
| GW2 | 40 | 35 |
| GW3 | 30 | 40 |
| GW4 | 10 | 15 |

In one embodiment, the revised allocation is implemented using historical data that provides sub-DNIS for the DNIS under consideration, as per operation 4064. An example of such historical data is provided below in Table IV.

TABLE IV

Distribution of Call Attempts for 609x

| Sub-DNIS | % Distribution |
|---|---|
| 6090 | 0 |
| 6091 | 10 |
| 6092 | 20 |
| 6093 | 10 |
| 6094 | 10 |
| 6095 | 20 |
| 6096 | 5 |
| 6097 | 5 |
| 6098 | 15 |
| 6099 | 5 |

Thus, one way to implement the revised allocation shown in Table III is to allocate sub-DNIS 6096 and sub-DNIS 6097 to GW1 (10%); sub-DNIS 6091, 6092 and 6099 to GW2 (35%); sub-DNIS 6093, 6094 and 6095 to GW3 (40%) and sub-DNIS 6098 to GW4 (15%).

As previously indicated, in the prior art, routing through the PSTN is performed without any consideration of the routing across the data network (i.e., originating gateway to terminating gateway). In accordance with some embodiments of the present invention, a switch and gateway (or trunk group) form a "cluster" and are jointly considered in developing a routing scheme. Such consideration results in improved efficiency and increased control over network performance.

Figure 8:
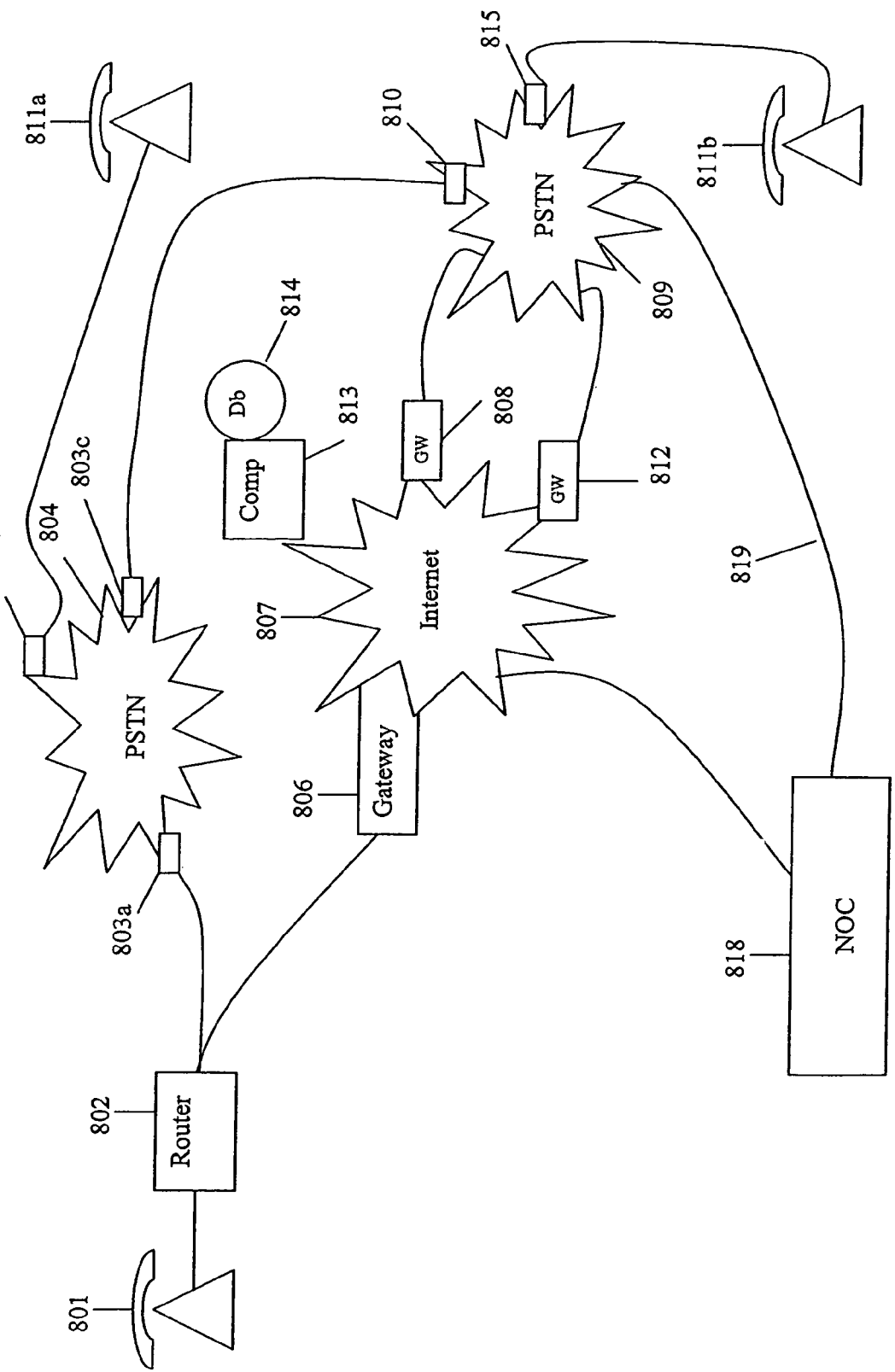
FIG. 8 illustrates an exemplary embodiment of a CPE router in conjunction with gateways in accordance with the present invention.

FIG. 8 depicts a further embodiment of the invention comprising a network having a PSTN and a plurality of gateways 806, 808, and 812 in communication with a data network 807. An exemplary call initiating telephone 801 is connected through a Customer Premises Equipment (CPE) router 802. The router 802 is capable of examining a telephone call's signaling and of performing conventional least-cost routing types of selection. A PSTN incoming switch 803a is shown connected through a PSTN 804 to an outgoing PSTN switch 803b or 803c. All PSTN switches, although designated as incoming or outgoing, are interchangeable and differ only in their current function.

In operation, a telephone call is initiated by telephone 801, and the dialed digits are transmitted to router 802. Although a telephone 801 is shown and described by way of example, such a telephone represents any one of various types of terminals, for example, a modem, fax, or computer device. In any case, the dialed digits are transmitted to router 802 for examination and processing.

Programmed into router 802 is a table of dialed properties of numbers that correspond to telephone numbers to be accessed over the data network 807, for example the Internet, and/or telephone numbers to be accessed over the PSTN telephone network 804. It is not critical how the information stored within router 802 is utilized to distinguish the calls which are to be transmitted via a data network from the calls which are to be transmitted via a PSTN. Thus, the table could include all area codes for which it is desirable to transmit calls over a data network, e.g., the Internet, with all others defaulting to the PSTN 804. Alternatively, the information within router 802 may identify all long distance calls, since more digits are dialed for such calls, and the numbers are typically flagged by a leading "1," and route all or most long distance calls via data network 807. Regardless of the technique used, router 802 is utilized to identify and route calls with predefined characteristics to the data network 807, and calls with other characteristics to the PSTN network 804.

Once the routing decision is made by router 802, the call is transmitted to PSTN 804 or via gateway 806 to data network 807. The call is typically routed through incoming switch 803a to PSTN 804 if the dialed number is local, and further transmitted through outgoing switch 803b to local telephone 811a. The call is also routed to PSTN 804 if the dialed number is distant, but there is no reasonable data network access, in which case the call is transmitted through outgoing switch 803c to distant incoming switch 810 of second PSTN 809; the call is next sent by PSTN 809 through outgoing switch 815 to distant telephone 811b. Data network access may not be available, for example, if the originating gateway is overloaded, or no terminating gateway is available in the location to which the call is destined.

If the intended destination of the call is not local and is reasonably accessible through a data network, router 802 will route the call to an originating gateway 806. Additionally, the router 802 may determine by an examination of the dialed number to which of plural originating gateways 806 (only one illustrated) the call should be routed. Such a feature would be advantageous, for example, if the originating gateways are capable of completing calls to different locations at different prices with respect to one another.

The properties of numbers or other information in router 802 may be altered as needed by transmitting a revised instruction via a communications channel 819 and through PSTN 809 and PSTN 804. For example, one or more of the monitored parameters discussed above is caused to change by a Network Operations Center (NOC) 818 instruction forwarded to router 802, and to one or more gateways. Such changes may be utilized to affect choices made by router 802 both as to network selection and the gateway or switch within a network for connecting calls of a specified class.

A still further aspect of the invention is implemented through use of a computer 813 and a database 814 that are accessed by typical initiating gateway 806. Computer 813 and database 814 are optionally connected from originating gateway 806 through network 807. The communication from router 802 connects through gateway 806 and network 807 to computer 813. After the authorization process, the call request passes to gateway 806. As will be described in detail with reference to FIG. 9, upon receipt by originating gateway 806 of an incoming call request, computer 813 accesses database 814 before processing the call to determine whether the call initiator is authorized to employ the system. If the caller is authorized, an approval message is sent to router 802, which responds by sending the called number to the gateway 806. Gateway 806 operates through data network 807 to identify a best value routing (BVR) to a selected output gateway 808 or 812, then sending the called number via the BVR to the selected second gateway. The second gateway connects to the second PSTN node 809, which completes the call to receiving telephone 811*b*.

Figure 9:
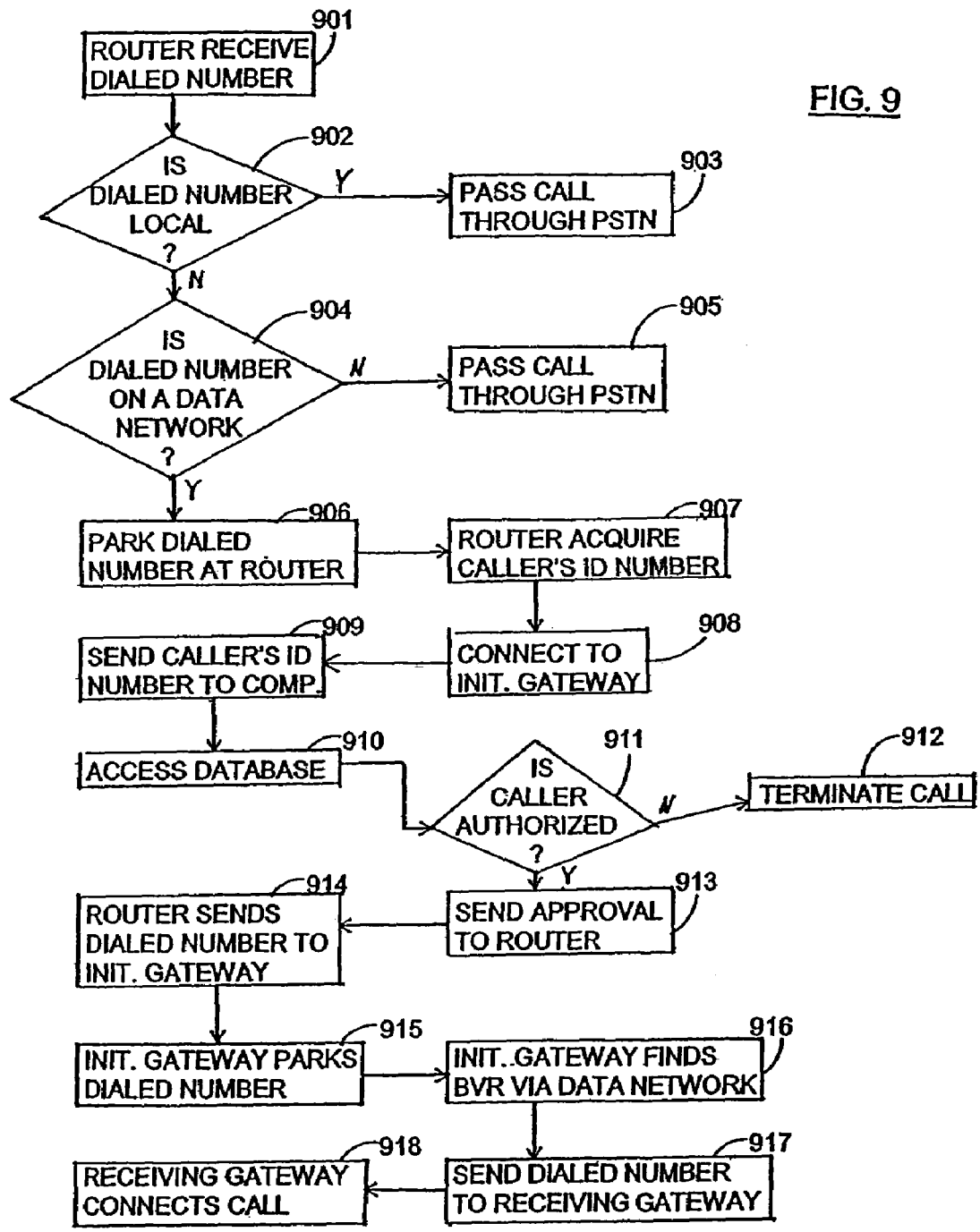
FIG. 9 is a flowchart of the method used in conjunction with the system of FIG. 8.

Referring now to FIG. 9, a flowchart of the present invention is illustrated with respect to the steps taken by the apparatus shown in FIG. 8. The router 802 (FIG. 8) receives a dialed number in step 901 and determines, based on programmed information, whether the dialed number involves a particular type of call, e.g. a local call, in step 902. If the dialed number is for a local call, the call is passed through a PSTN in step 903 to complete the call. If the dialed number is not for a local call, the system determines in step 904 whether the dialed number is for a destination that is accessible through a data network. If the dialed number is not for a data network-accessible destination, the call is passed through the PSTN at step 905, following which the PSTN determines long distance routing to be utilized and completes the call.

If the dialed number is for a data network-accessible destination, the dialed number is now cached, or parked, at the router in step 906 and the router acquires the caller's identifying number in step 907. The steps required to initially set up the call are performed using an out of band network, such and the SS7 standardized signaling.

Having completed the basics to establish the desired call, the following steps are performed on the data and voice network as "in band." A connection is made to an initiating gateway in step 908, and the caller's identifying number is sent to a connected computer in step 909. As described above, the connection may be made to the computer directly and only passed to the gateway after the authorization step. The computer accesses a database in step 910 and makes a determination in step 911 as to whether the caller is an authorized user of the system by comparison of information stored in the database. If the caller is not authorized, the call is terminated in step 912. If the caller is authorized, an approval is sent in step 913 to the router which, in step 914, sends the dialed number to the initiating gateway in band.

Note that the dialed number is sent in band, rather than the conventional telephony technique of sending the dialed number out of band during call set up, because a separate call is required from the router 802 to the gateway 806 before the dialed number is sent to the gateway 806. Since most or all calls that are transmitted over data network 807 will be long distance calls, and since a call from router 802 to gateway 806 will normally be a local call, the router must substitute a local number for the long distance number when setting up the call using the SS7 network. Only after the call from router 802 to gateway 806 is established is the actual called number sent to the gateway 806, and even then, such called number is sent in band, over the already established communications channel between router 802 and gateway 806.

The initiating gateway parks the dialed number in step 915 and attempts to locate a best value routing (BVR) destination gateway for the call destination in step 916. The BVR routing decision involves determining, based on cost, load factors, and availability, a preferred terminating gateway to be used to complete the call. The dialed number is sent to the selected receiving gateway in step 917, and the receiving gateway completes the call in step 918. The call is then conveyed over the data network as previously described.

It is noted that the BVR techniques for routing the call over the Internet or data network need not be used in conjunction with the novel techniques used by the router.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. Apparatus for routing a telephone call by a caller to a called telephone, to a data network, the apparatus comprising:
    (a) a memory for storing a category of telephone numbers representing telephone calls to be placed over a data network in packet switched format;
    (b) processing means for accepting a dialed telephone call directly from a device initiating said call, and for determining whether a called number of said call is within said category, and for routing said call through an originating gateway to said data network if so; and
    (c) means for selecting, after said called number of said dialed call is determined to be within said category, said originating gateway from plural originating gateways each being capable of conveying said call to said data network, wherein said processing means determines whether said call is routed more economically over said data network or over a telephone network, and wherein said called telephone is accessable over either network.

2. Apparatus of claim 1 connected to a data network, wherein said memory stores information concerning which of said plural originating gateways to utilize to access said data network.

3. Apparatus of claim 2 wherein said each of said originating gateways is capable of communicating over said data network to plural terminating gateways.

4. Apparatus of claim 1 wherein said category is comprised of all calls outside of an area code in which the call originates.

5. Apparatus of claims 3 connected via a data network to an operations center, said operations center being capable of altering information stored within said memory and implementing changes to said category of telephone numbers.

6. Apparatus of claim 4 connected via a telephone network to an operations center, said operations center being capable of altering information stored within said memory and implementing changes to said category of telephone numbers.

7. Apparatus of claim 1, further comprising means for authenticating said caller by an identifier of said caller if said telephone call is determined to be within the category, and for forwarding, after said caller is authenticated, a dialed number associated with said call to said selected originating gateway so as to route said telephone call through said selected originating gateway to said data network.

8. Apparatus of claim 7, further comprising means for setting up a first connection between said apparatus and said selected originating gateway for transmitting said identifier of said caller over said first connection to said selected originating gateway so as to be forwarded by said selected originating gateway to a computer over a second connection over said data network for authenticating said caller.

9. Apparatus of claim 8 further comprising means for forwarding said dialed number to said selected originating gateway through said first connection after said caller is authenticated.

10. A method for routing a telephone call by a caller, comprising the steps of:
    (a) receiving, at a router, the call directly from a device initiating the call and examining a called telephone number associated with said call to ascertain whether a particular property is present;

(b) if so, selecting one from plural originating gateways each being capable of conveying said call to a data network, and routing the call to said selected originating gateway, and if not, routing the call to a telephone switch; and (c) if said call is routed to said selected originating gateway, examining the called telephone number again to determine to which of a plurality of terminating gateways said call should be routed.

11. The method of claim 10 wherein said originating gateway makes said determination of said terminating gateway in conjunction with other gateways.

12. The method of claim 11 further comprising the step of reallocating traffic among plural terminating gateways.

13. A method of claim 10 further comprising the steps of authenticating the caller by an identifier of said caller if said particular property is present in said dialed telephone number, and forwarding, after said caller is authenticated, said dialed telephone number to said selected originating gateway.

14. The method of claim 13, further comprising the steps of setting up a first connection between said router and said selected originating gateway for transmitting said identifier of said caller over said first connection to said selected originating gateway so as to be forwarded by said selected originating gateway to a computer over a second connection over said data network for authenticating said caller.

15. The method of claim 14, further comprising the steps of forwarding said dialed telephone number to said selected originating gateway through said first connection after said caller is authenticated.

16. A method of completing a telephone call by a caller, comprising the steps of:

(a) receiving the call, at a router, directly from a device initiating said call and examining a dialed number associated with said call;

(b) if said number is determined, by said examining, to be within a predetermined class of numbers, selecting one from plural originating gateways each being capable of conveying said telephone call to a data network, and conveying said telephone call to a first remotely located telephone switch over said data network; and (d) if said number is not within said predetermined class of numbers, conveying said telephone call to a second remotely located telephone switch over a telephone network.

17. The method of claim 16 wherein said first or second remotely located telephone switch is reached via either a telephone switch, a first terminating gateway, or a second terminating gateway, and wherein the determination of which of said first or second terminating gateways or said telephone switch is utilized to reach said first or second remotely located telephone switch is made at least in part by comparing a predetermined subset of digits contained in said dialed number.

18. The method of claim 16, further comprising the steps of authenticating the caller by an identifier of said caller if said dialed number is within said predetermined class of numbers, and forwarding, after said caller is authenticated, said dialed number to said selected originating gateway.

19. The method of claim 18, further comprising the steps of setting up a first connection between said router and said selected originating gateway for transmitting said identifier of said caller over said first connection to said selected originating gateway so as to be forwarded by said selected originating gateway to a computer over a second connection over said data network for authenticating said caller.

20. The method of claim 19, further comprising the steps of forwarding said dialed number to said selected originating gateway through said first connection after said caller is authenticated.

21. A network for completing telephone calls, the network comprising a router connected directly to a device initiating said calls, the router being programmed to examine dialed numbers associated with calls to determine which of the calls shall be routed to a packet switching network, said router further being programmed to separate long distance calls from local calls, to transmit some of said long distance calls and all of said local calls over a circuit switching network, and the remainder of said long distance calls over said packet switching network, and to select, for each specific long distance call to be transmitted over the packet switching network, one from plural of originating gateways each being capable of conveying said each specific call to said packet switching network after a dialed number associated with said specific call is examined.

22. The network of claim 21 wherein said selected originating gateway is in communication with said router for converting the specific dialed telephone call from a circuit switched calls to a packet switched call, and for routing same over said packet switching network.

23. The network of claim 22 further comprising a terminating gateway to convert telephone calls from a packet switching format on said packet switching network to a circuit switching format, and to place said calls in circuit switching format on said circuit switching network.

24. The network of claim 23 wherein each of said terminating gateways incurs a charge as a result of terminating said calls, and wherein changes in such charges are utilized to update routing information stored in said router.

25. The network of claim 21, wherein said router is further programmed to authenticate a caller of said specific long distance call by an identifier of said caller after said specific call is determined to be transmitted over the packet switching network, and programmed to forward, after said caller is authenticated, a dialed number associated with said specific call to said selected originating gateway.

26. The network of claim 25, wherein said router is programmed to set up a first connection between said router and said selected originating gateway for transmitting said identifier of said caller over said first connection to said selected originating gateway so as to be forwarded by said selected originating gateway to a computer over a second connection over said data network for authenticating said caller.

27. The network of claim 26, wherein said router is further programmed to forward said dialed number to said selected originating gateway through said first connection after said caller is authenticated.

28. A method for routing a telephone call by a caller over a data network comprising the steps of:

(a) receiving a dialed number associated with the call and examining said dialed number by a router directly connected to a device initiating the call to determine whether the call shall be routed over said data network;

(b) if yes, parking the dialed number at the router;

(c) if the call is determined to be routed over said data network after said step of examining said dialed number, selecting one from plural originating gateways each being capable of conveying said call to said data network, and transmitting the dialed number from the router to said selected originating gateway;

(d) parking the dialed number at the originating gateway;
(e) finding an optimum terminating gateway to accept said call over said data network;
(f) sending the dialed number from the first gateway to a second gateway over said data network; and
(g) connecting the call to a terminal identified by the dialed number, wherein the dialed number represents a called telephone accessable by either the data network or a telephone network.

29. The method for routing a telephone call as described in claim 28, further comprising the steps of acquiring the caller's number and determining if the caller is authorized.

30. The method of claim 29, wherein the step of determining if the caller is authorized, comprises:
(a) transmitting the caller's number from the router to a computer;
(b) accessing a database associated with the computer; and
(c) comparing a caller's number to information stored in the database.

31. The method for routing a telephone call as described in claim 29, further comprising the step of sending an authorization to the router if the caller is authorized.

32. The method for routing a telephone call as described in claim 29, further comprising the step of terminating the call if the caller is not authorized.

33. The method for routing a telephone call as described in claim 28, further comprising the step of locating an optimum terminating gateway.

34. The method of claim 28, further comprising the steps of authenticating the caller by an identifier of said caller if said call is determined to be routed over said data network.

35. The method of claim 34, further comprising the steps of setting up a first connection between said router and said selected originating gateway for transmitting said identifier of said caller over said first connection to said selected originating gateway so as to be forwarded by said selected originating gateway to a computer over a second connection over said data network for authenticating said caller.

36. The method of claim 35, wherein said dialed number is transmitted over said first connection to said selected originating gateway after said caller is authenticated.

37. A method for routing a telephone call by a caller, comprising the steps of:
(a) receiving a dialed number associated with the call and examining said dialed number by a router directly connected to a device initiating the call to determine whether the call shall be routed over a data network;
(b) if yes, parking the dialed number at the router;
(c) determining if the caller is authorized;
(d) if the call is determined to be routed over said data network after said dialed number is examined, and if the caller is authorized, selecting one from plural first gateways each being capable of conveying said telephone call to said data network, sending the dialed number from the router to a said selected first gateway;
(e) parking the dialed number by the selected first gateway;
(f) sending the dialed number from the selected first gateway to a second gateway; and
(g) connecting the call to a terminal identified by the dialed number, wherein the call may be completed either over the data network or a telephone network, depending upon which is more economical.

38. The method for routing a telephone call as described in claim 37, further comprising the steps of acquiring the calling number by the router and transmitting the calling number from the router to a computer.

39. The method for routing a telephone call as described in claim 37, further comprising the step of selecting a terminating gateway.

40. The method for routing a telephone call as described in claim 37, further comprising the step of sending an authorization to the router if the caller is authorized.

41. The method for routing a telephone call as described in claim 37, further comprising the step of terminating the call if the caller is not authorized.

42. The method of claim 37, wherein said caller is authenticated by an identifier of said caller after said call is determined to be routed over said data network.

43. The method of claim 42, further comprising the steps of setting up a first connection between said router and said selected first gateway for transmitting said identifier of said caller over said first connection to said selected first gateway so as to be forwarded by said selected first gateway to a computer over a second connection over said data network for authenticating said caller.

44. The method of claim 43, wherein said dialed number is sent from said router to said selected first gateway through said first connection after said caller is authenticated.

* * * * *